United States Patent [19]
Watanabe et al.

[11] Patent Number: 5,678,136
[45] Date of Patent: Oct. 14, 1997

[54] IMAGE FORMING APPARATUS WITH CHARGING MEMBER SUPPLIED WITH FIRST AND SECOND DC VOLTAGES OF OPPOSITE POLARITIES

[75] Inventors: Osamu Watanabe, Tokyo; Nobuyuki Kume, Yokohama; Hiroshi Matsumoto, Kawasaki; Sorin Den, Yokohama, all of Japan

[73] Assignee: Canon Kabushiki Kaisha, Tokyo, Japan

[21] Appl. No.: 503,932

[22] Filed: Jul. 19, 1995

[30] Foreign Application Priority Data

Jul. 19, 1994 [JP] Japan .................................. 6-188932

[51] Int. Cl.⁶ .......................... G03G 15/00; G03G 15/02
[52] U.S. Cl. ........................ 399/100; 399/168; 399/176
[58] Field of Search .......................... 355/219; 361/225; 430/902; 399/50, 98, 99, 100, 115, 168, 169, 174, 176

[56] References Cited

U.S. PATENT DOCUMENTS

4,360,262  11/1982  Genthe ..................................... 355/219
5,331,383   7/1994  Nou et al. ............................... 355/274
5,371,578  12/1994  Asano et al. ........................... 355/219
5,443,873   8/1995  Itani et al. ........................... 355/219 X

*Primary Examiner*—Arthur T. Grimley
*Assistant Examiner*—Quana Grainger
*Attorney, Agent, or Firm*—Fitzpatrick, Cella, Harper & Scinto

[57] ABSTRACT

An image forming apparatus includes an image bearing member; a charging member for charging the image bearing member at a charging position, the charging member being contactable to the image bearing member; wherein the charging member is adapted to be supplied with a first DC voltage of a predetermined polarity for forming an image on the image bearing member and contains ion conduction material, and wherein the charging member is adapted to be supplied with a second voltage of a polarity opposite from the predetermined polarity when such an area of the image bearing member as is going to a non-image area of the image bearing member is at the charging position.

4 Claims, 5 Drawing Sheets

(+) SURFACE ←    (−) CORE METAL →

BEFORE APPLICATION

FIG. 3A

NEGA. DC

FIG. 3B

STOP

IMAGE FORMING APPARATUS WITH CHARGING MEMBER SUPPLIED WITH FIRST AND SECOND DC VOLTAGES OF OPPOSITE POLARITIES

FIELD OF THE INVENTION AND RELATED ART

The present invention relates to a charging device usable with an image forming apparatus such as a copying machine, printer or the like, for charging (including discharging) a surface of an image bearing member such as a photosensitive member dielectric member or other member, to be charged.

As for the means for charging an image bearing member, such as a photosensitive member, a dielectric member or the like, or another member to be charged in an image forming apparatus, such as an electrophotographic apparatus, an or electrostatic recording apparatus or the like, a contact charging member is contacted to the member to be charged, while the charging member is supplied with a voltage.

The contact charging system is advantageous over a corona charging system using a corona wire and shield, in that the voltage required to charge the member to be charged to a desired potential is lower, that the amount of ozone produced is very small and therefore an ozone filter is not required, that an air discharging system can be simplified, that the charging device is maintenance free, and that the structure is simple.

When an AC biased DC voltage is supplied to the charging member, if the process speed is high, it is desired that the frequency of the AC voltage is high to prevent occurrence of cyclic non-uniformity. However, if the frequency is high, so-called charging noise is produced. From this standpoint, it is preferable to apply a DC voltage only.

If the charging member is of electroconductive and elastic material, and if it is rotated by the photosensitive member contacted thereto, application of DC voltage alone results in a resistance of the whole circumference of the charging member increasing with an increase of operations, which leads to improper charging corresponding to the rotational frequency of the charging member.

SUMMARY OF THE INVENTION

Accordingly, it is a principal object of the present invention to provide an image forming apparatus without occurrence of improper charging attributable to an increase of resistance of the charging member after long term use.

It is another object of the present invention to provide an image forming apparatus wherein a charging member is supplied with a DC voltage to charge the member to be charged.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENT

Embodiment 1 (FIGS. 1–5)

(1) Example of image forming apparatus

Figure 1:
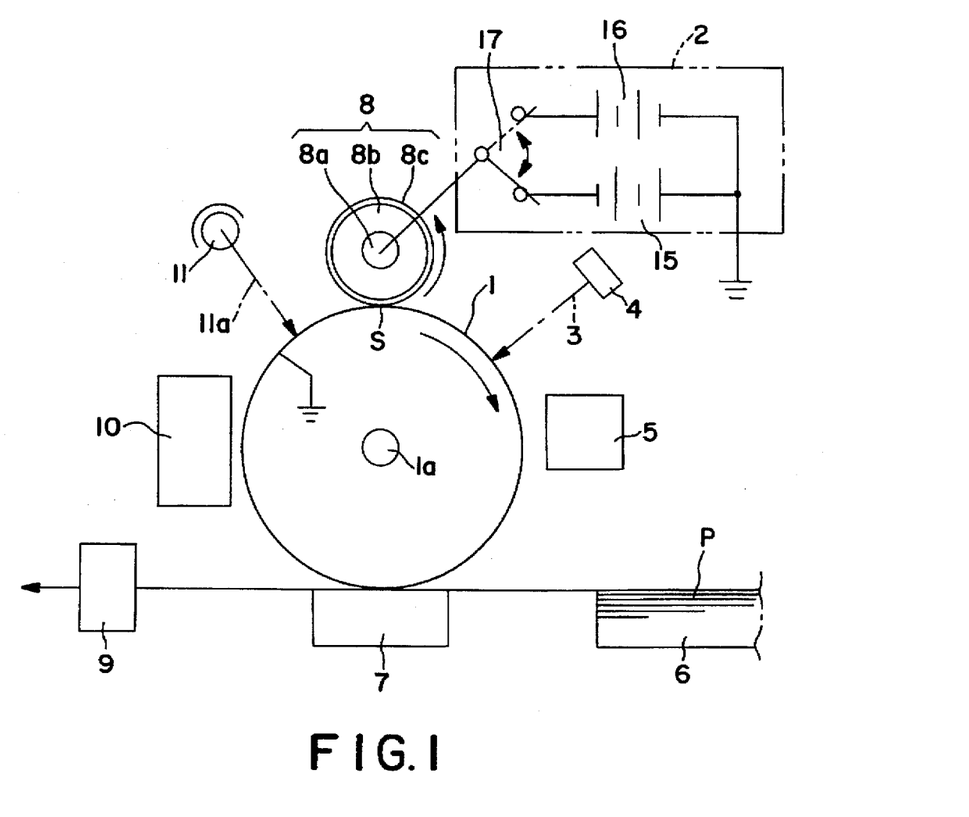
FIG. 1 is a schematic illustration of an example of an image forming apparatus.

FIG. 1 schematically shows an example of an image forming apparatus, which is a copying machine or printer using electrophotographic and image transfer type.

Designated by reference numeral 1 is an image bearing member in the form of a rotatable drum type electrophotographic photosensitive member (photosensitive drum), which is rotatable about a center 1a at a predetermined peripheral speed (process speed) in the clockwise direction indicated by an arrow. In this embodiment, it is provided with am OPC photosensitive layer chargeable to a negative polarity.

Designated by reference numeral 8 is a charging roller as the contact charging member, which is rotatably supported to extend substantially parallel with the photosensitive drum 1. It is press-contacted to the photosensitive drum 1 by an unshown urging means. In this embodiment, the charging roller is rotated by the photosensitive drum. The nip formed therebetween is indicated by S.

The core metal 8a of the charging roller 8 is supplied with a DC voltage of a predetermined polarity (−) and a predetermined potential from a bias voltage source 2 to uniformly charge (primary charging) a peripheral surface of the photosensitive drum 1 to a predetermined potential of the predetermined polarity (−) through a contact charging process.

The charged surface of the photosensitive drum 1 is exposed to an information bearing light 3 by image information projecting means 4 (analog imaging exposure for an original image or digital scanning exposure means with laser beam or the like) so that an electrostatic latent image is formed on the surface of the rotating photosensitive drum in accordance with the image information.

The electrostatic latent image is developed into a toner image with toner particles charged to a regular polarity by a developing device 5.

On the other hand, a transfer material P is fed one by one from an unshown feeding mechanism from a sheet cassette in a sheet feeding station. The transfer material P is fed, at a predetermined timing, to an image transfer position formed between a photosensitive drum 1 and transfer means 7 supplied with a negative polarity (transfer charging roller), so that a toner image is transferred onto a surface of transfer material P from the surface of the photosensitive drum 1.

The transfer material P now having a toner image is separated from the surface of the photosensitive drum 1, and is introduced into an image fixing device 9 where the toner image is fixed.

The surface of the photosensitive drum after image transfer thereof is cleaned by a cleaning device 10 so that residual toner is removed, and the whole surface thereof is exposed to uniform light 11a by a pre-exposure device 11 so that a residual charge is removed, thus being prepared for repeated image forming operations.

(2) Charging Roller 8

The charging roller 8, as a contact charging member, has a core metal 8a penetrating the center, and a conductive layer 8b covering the core metal 82.

The conductive layer 8b is a low hardness material, such as resin material, such as polyurethane, polyester, polyvinylalcohol or the like, or rubber, such as EPDM, NBR or the like. The material is an ion conduction type, such as those in which lithium chlorate, high boron (boron compound) or the like pigment are added or dispersed, or an electronic conduction type, such as those in which carbon black, carbon graphite, titanium oxide, zinc oxide or the like pigment is added. From the standpoint of preventing current leakage from the surface layer of the charging roller to the photosensitive drum and from the standpoint of stability against ambient condition change or the like, the former is preferable.

The conductive layer 8b is coated with a surface layer 8c having a volume resistivity higher than that of the conductive layer 8b. The surface layer 8c is formed such that the resistance value at the position corresponding to the image forming area is intermediate ($10^6$–$10^{10}$ Ohm per 1cm$^2$). The material of the surface layer 8c is a resin material such as polyimide, polyamide, polyurethane; polyester, silicone, Teflon (PTFE, Dupont) added with electroconductive pigment, as in the conductive layer 8b, to adjust the resistance of the entire unit to an intermediate level.

If the resistance of surface layer 8c is less than $1\times10^6$ Ohm per 1cm$^2$, the durability against the voltage is not sufficient when the photosensitive drum 1 is damaged, and therefore, it is not preferable. If, on the other hand, it is more than $1\times10^{10}$ Ohm per 1cm$^2$, there occurs a possibility of improper charging due to insufficient current.

The resistance of the entire periphery of the charging roller 8 an increase in the number of operations. In the a DC application type, the photosensitive drum 1 may be charged nonuniformly corresponding to the rotation frequency of the charging roller.

Regarding the mechanism of the increase in the resistance of the electroconductive rubber of the charging roller, a detailed analysis has not been completely understood. However, the inventor's experiments and investigations suggests to the following mechanism exists.

Figure 2:
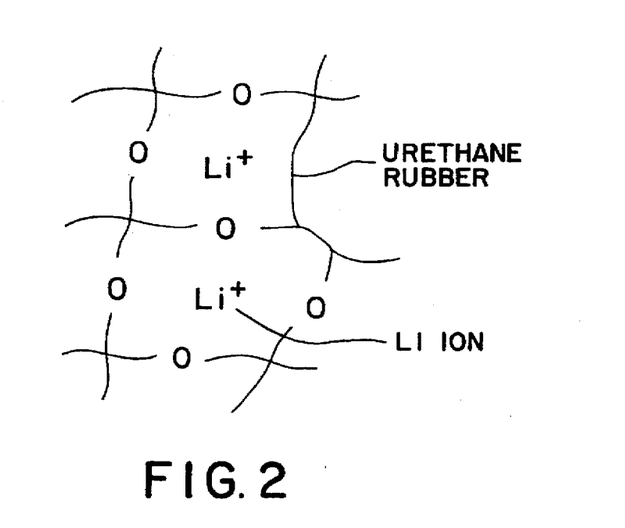
FIG. 2 show a schematic structure of an ionic conduction urethane rubber.
Figure 3A:
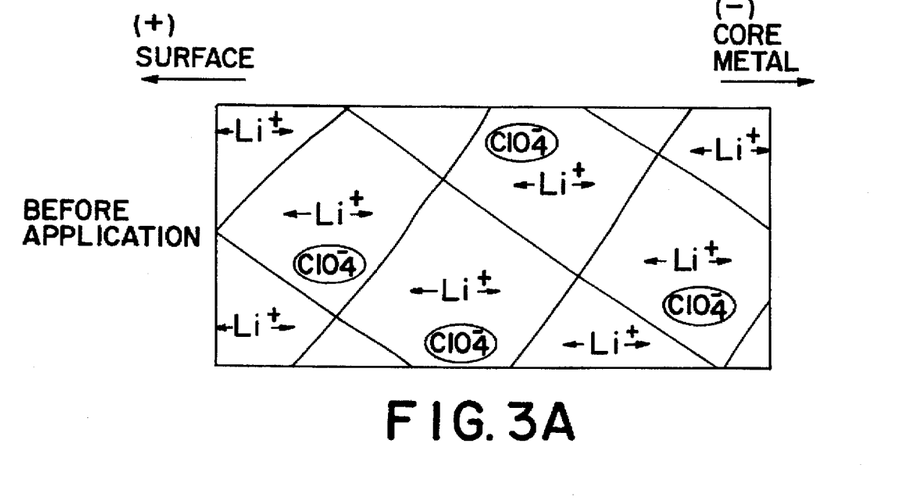
FIGS. 3a, 3b and 3c schematically show a mechanism of electric conduction of the ion conduction urethane rubber.
Figure 3B:
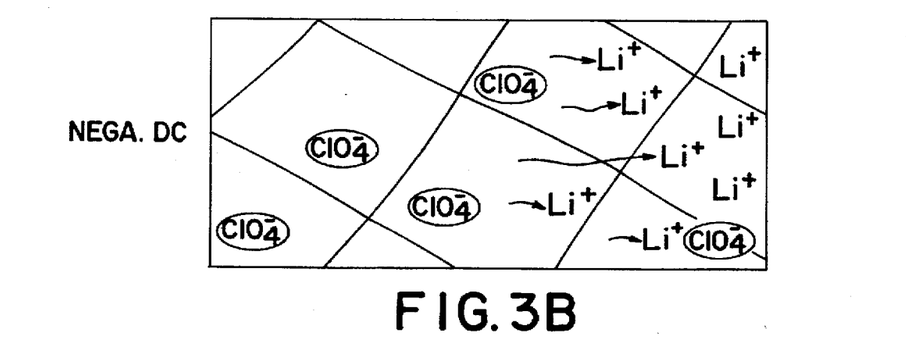
Figure 3C:
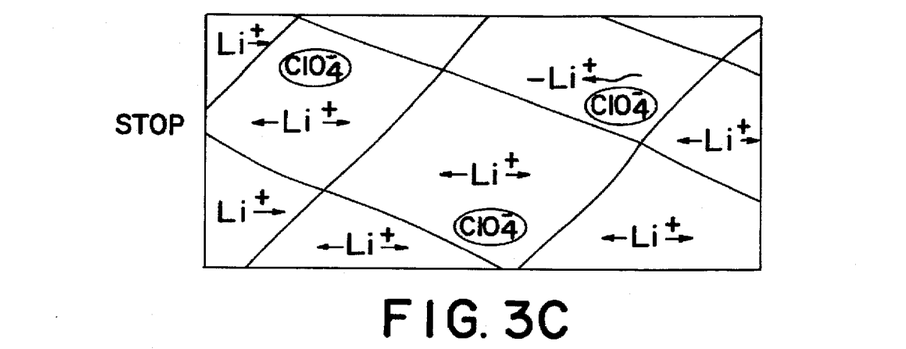

FIG. 2 is a schematic view illustrating a structure of ionic conduction type rubber constituting conductive layer 8b of the charging roller 8. In this example, lithium perchlorate is added to polyetherpolyol polyurethane rubber as pigment at proper content. FIGS. 3a to 3c are schematic sectional view of the conductive layer of the charging roller using such electroconductive rubber. The lithium perchlorate is uniformly dispersed between a bridge of the urethane rubber in the form of lithium ions (Li$^+$, cation), and vibrates (FIG. 3a). When a DC voltage is applied (−1.4 Kv to core metal 8a in this example), the lithium ions Li$^+$of positive polarity move to the negative electrode (core metal) with the result that the content of the lithium ions Li$^+$increases adjacent the negative electrode. The perchlorate ions C1O$_4$$^-$should move to the positive electrode, but the ion radius of the ions is not so small as to be able to move within the bridge structure of the urethane rubber, and therefore, the ions remain in the same positions (FIG. 3(b). When the voltage application stops, the motion of the lithium ions Li$^+$stops to become uniformly dispersed in the urethane rubber. Thus, the situation returns to the vibration in the bridge (FIG. 3(c).

When the application of the voltage to the charging roller 8 is repeated (FIGS 3b and 3c) the above described processes would be repeated reversibly. Actually, however, the continuous voltage application results in concentration of the lithium ions Li$^+$adjacent the negative electrode, and therefore, the lithium ions Li$^+$are not uniformly dispersed. Therefore, the number of freely movable lithium ions Li$^+$decreases, and the resistance of the conductive layer of the charging roller increases. (3) Elimination of increase of resistance in the charging roller In order to eliminate improper charging due to resistance increase in the charging roller, first DC voltage source 15 and second voltage source 16 are provided by bias application source 2 to the charging roller 8, in this embodiment.

Figure 4:
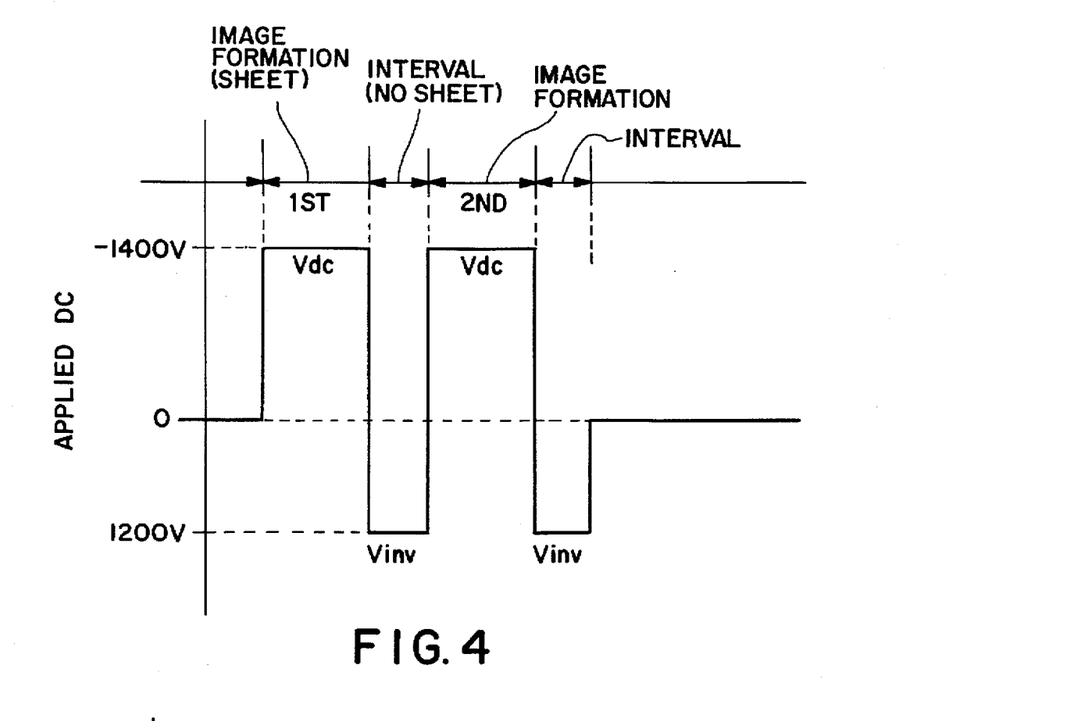
FIG. 4 shows a DC voltage application sequential control for the charging roller (timing chart).

As shown in FIG. 4, the switch 17 takes the position for the first DC voltage source during the image forming operation (charging operation for electrostatic latent image formation) to apply a predetermined DC voltage Vdc of predetermined polarity and potential for the primary charging (−1400v in this embodiment).

In the sheet interval period (non-sheet-passing period) in which the charging roller 8 is contacted to the area corresponding to the area which is going to be non-image-formation areas of the photosensitive drum 1, the switch 17 takes the position for the second voltage source 16, by which a DC voltage (reverse bias) Vinv of the polarity opposite from that to the Vdc for the primary charging is applied (+1200v, in this embodiment).

Figure 5:
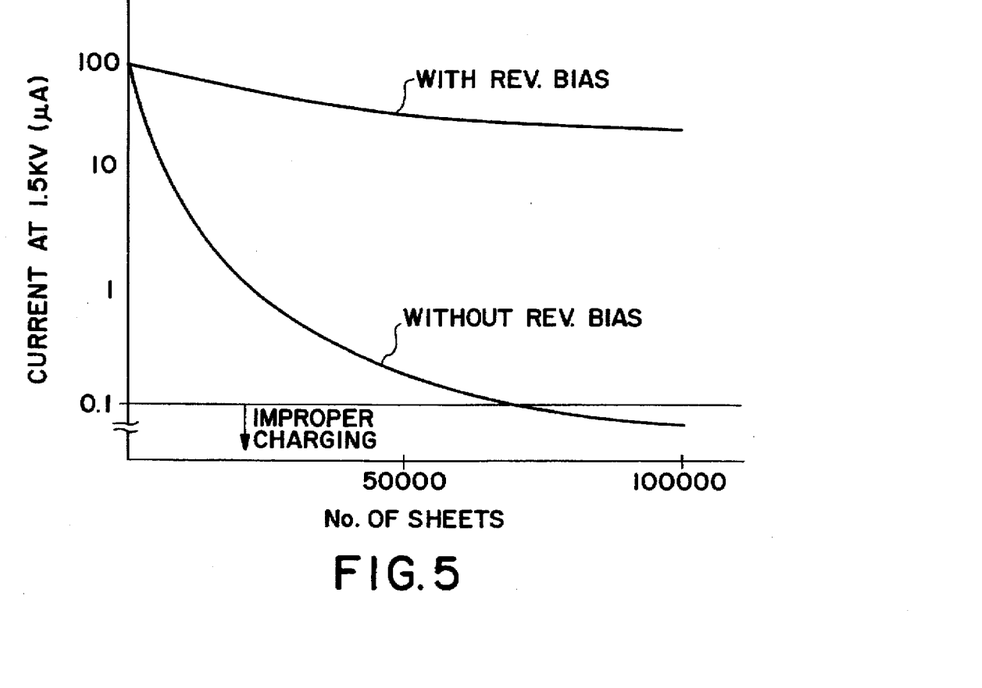
FIG. 5 is a graph of resistance change during long term operation of the charging roller when a reverse bias is applied and when it is not applied.

With the use of the inverse bias voltage, when continuous operations are carried out, the increase in the resistance of the charging roller 8 is hardly recognized, as will be apparent from comparison in FIG. 5, between the FIG. 4 sequence and the case without a positive voltage application period.

The reason is considered as follows. By the application of the voltage of a polarity opposite from the voltage for charging latent image formation to the charging roller in the area corresponding to the sheet interval, unilateral distribution of the lithium ions Li$^+$is prevented, thus accomplishing uniform dispersion to permit free motion of the ions.

The DC voltage Vinv applied in the area corresponding to the sheet interval to the charging roller 8, is effective if it has a polarity opposite from that of the DC voltage Vdc for the primary charging applied to the charging roller 8, for the purpose of preventing an increase in the resistance with use. Further preferably, the following is satisfied so that deterioration of the photosensitive member is not produced:

$$0.2|Vdc| \leq |Vinv| \leq 2|Vdc|$$

As described above, the application of the DC voltage to the charging roller 8 for such an area of the photosensitive drum 1 as is going to be the area on which no image is formed (sheet interval), is carried out with the DC voltage with a polarity opposite from that for such an area as is going to be the area on which an image is formed, by which an increase in the resistance of the conductive layer of the charging roller can be suppressed, and therefore, improper charging is prevented. The area on which an image is formed (image area) means an area, in the direction of the movement direction of the drum, on which a desired image can be formed, and the area on which no image is formed (non-image area) means an area, in the movement direction, on which an image is not formed.

Figure 6:
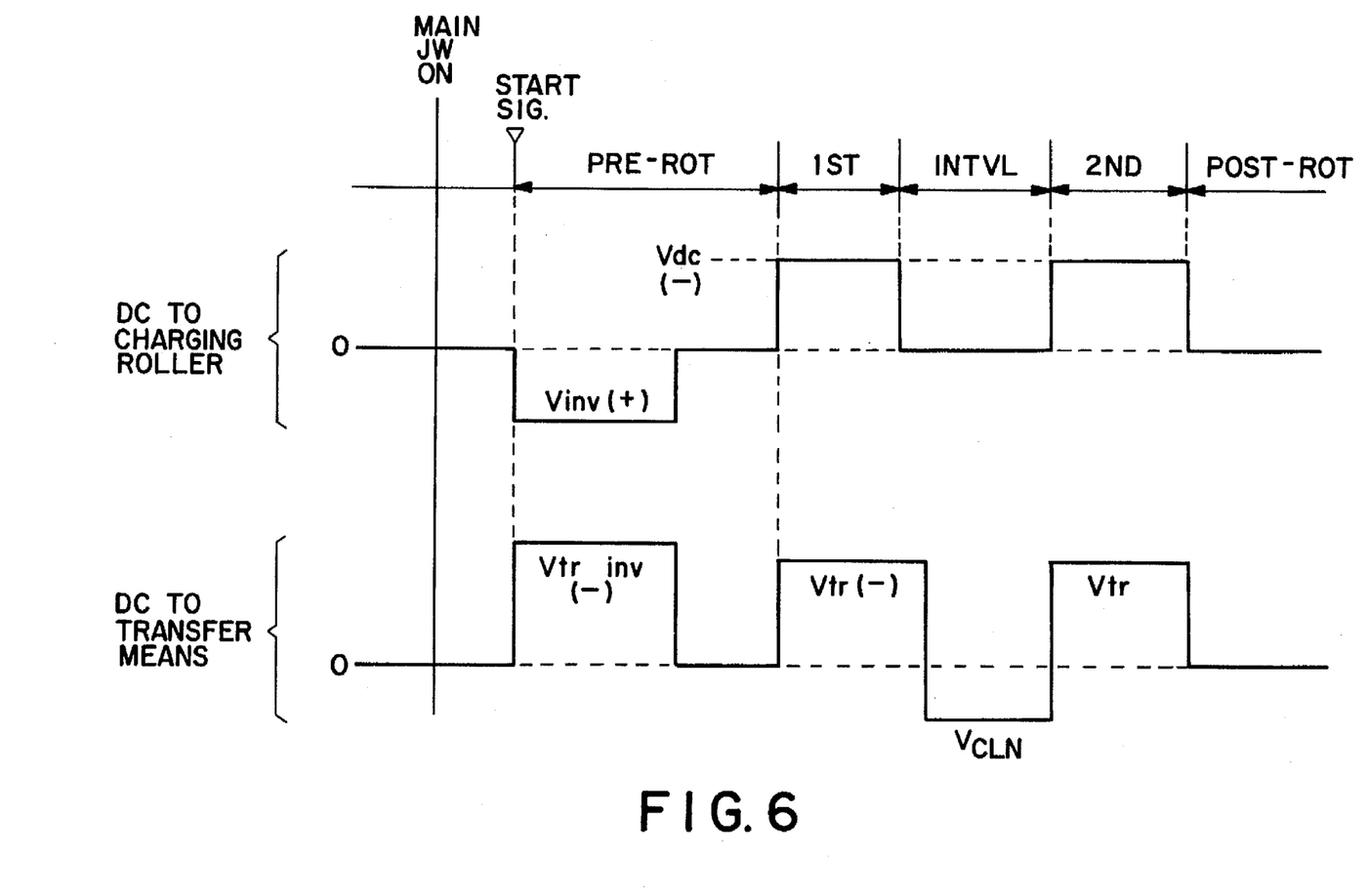
FIG. 6 shows a DC voltage application sequential control for the charging roller, according to a second embodiment of the present invention.

Embodiment 2 (FIG. 6)

In this embodiment, as shown in FIG. 6, for an area that is going to be a non-image area, the charging roller 8 is supplied with a bias Vinv of a polarity opposite from that for the primary charging, by the second voltage source 16, during the pre-rotation period.

When an area which is going to a non-image area is at the transfer position, the transfer means 7 is supplied with a voltage Vtr-inv of the same polarity as Vdc for the primary charging.

When the photosensitive member is supplied with the inverse voltage Vinv, the inverse (positive) polarity charge remains on the photosensitive member with the result of deterioration of the photosensitive member. To prevent this, a voltage of the same polarity (negative) as that of the voltage Vdc applied to the charging roller 8 for the area that is going to be the image area is applied by the transfer means to cancel the charge causing the problem. The absolute value of the voltage Vtr-inv is Preferably larger than that of the voltage Vinv, where Vtr is the voltage applied to the transfer roller during the transfer operation, and VCLN is a cleaning voltage applied to the transfer roller to remove toner from the transfer roller the photosensitive member when an image transfer operation is not carried out.

Figure 7A:
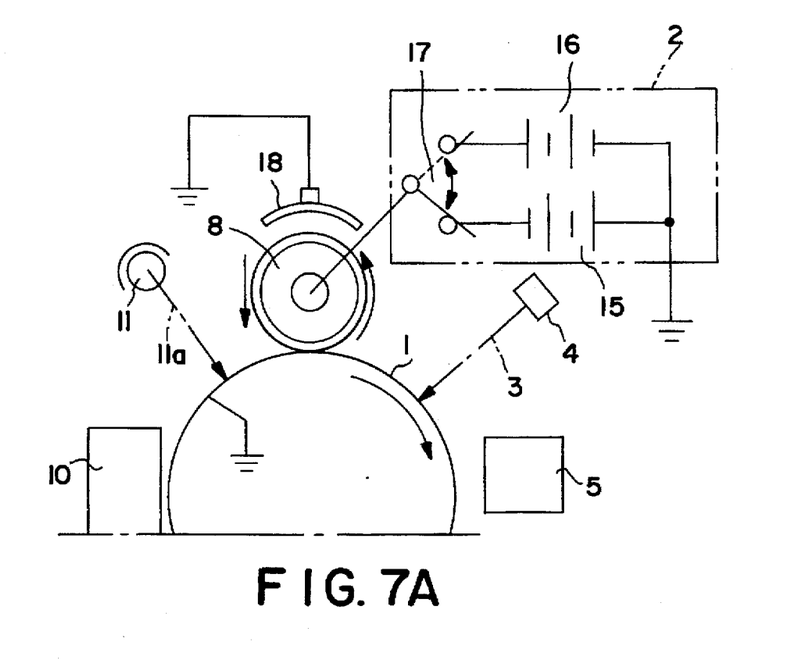
FIGS. 7(a) and 7(b) respectively show an apparatus according to a third embodiment of the present invention, wherein the charging roller is press-contacted to the photosensitive drum, and wherein it is not press-contacted to the photosensitive drum.
Figure 7B:
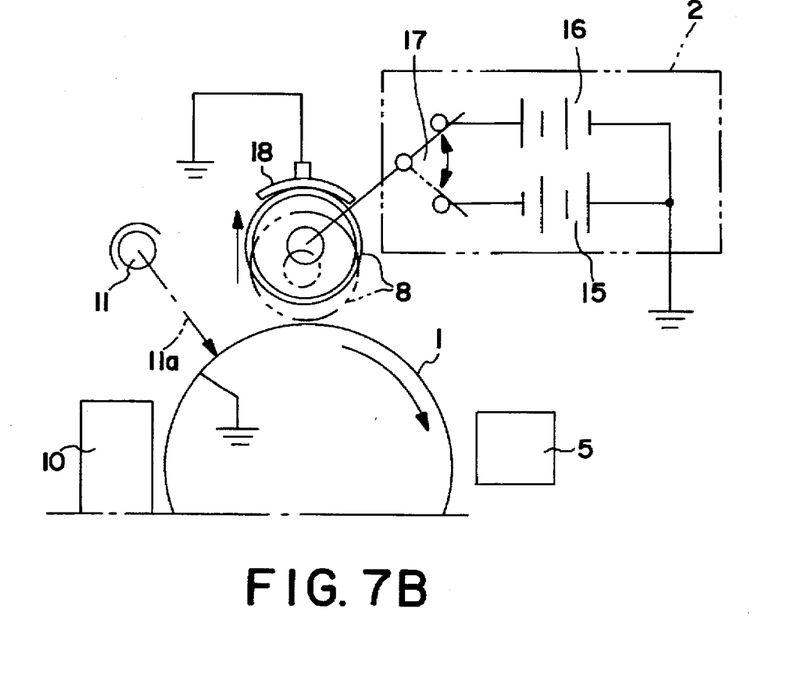

Embodiment 3 (FIG. 7)

In this embodiment, the charging roller 8 movable, by unshown swinging means such as a solenoid or the like, between a first position where it is press-contacted to the photosensitive drum 1 (as shown in FIG. 7(a)) and a second position where it is remote from the photosensitive drum 1 and maintained out of contact with the photosensitive drum 1 (FIG. 7(b)).

Designated by 18 is a charging roller cleaning member to which the charging roller 8 is contacted when the charging roller 8 is at the second position. It has a resistance of approx. $10^7$ Ohm and is electrically grounded.

During image forming operation, the charging roller 8 is maintained press-contacted to the photosensitive drum 1 as shown in FIG. 7(a), and the switch 17 takes the position for applying the first DC voltage source, by which the charging roller 8 is supplied with a DC voltage Vdc of a predetermined polarity (−) and potential for the primary charging.

When the charging roller 8 is contacted to an area of the photosensitive drum 1 which is going to be a non-image area, the charging roller 8, as shown in FIG. 7(b), is raised from the photosensitive drum 1 and maintained at a non-contact state relative to the photosensitive drum 1 but in contact with the cleaning member 18, and the switch 17 takes the position for applying the second voltage source 16, by which the charging roller 8 is supplied with a DC voltage Vinv (+) of the opposite polarity.

With the structure described above, a new path through the voltage source 16, charging roller 8 and the cleaning means 18, and a voltage Vinv of the opposite polarity is applied to only the charging roller, it is not applied to the photosensitive drum 1. Therefore, the photosensitive drum 1 is not deteriorated.

In the foregoing embodiments, the charging member is a charging roller contactable to the photosensitive member and is driven by the photosensitive member. The charging roller may be non-rotatable, or may be forcedly rotated codirectionally or counterdirectionaly relative to the photosensitive drum by a motor through gears or the like. The charging member is not limited to a roller type but may be a blade, block, pad or other structure.

While the invention has been described with reference to the structures disclosed herein, it is not confined to the details set forth and this application is intended to cover such modifications or changes as may come within the purposes of the improvements or the scope of the following claims.

What is claimed is:

1. An image forming apparatus, comprising:

an image bearing member;

a charging member for charging said image bearing member at a charging position, said charging member being contactable to said image bearing member;

wherein said charging member is adapted to be supplied with a first DC voltage of a predetermined polarity for forming an image on said image bearing member and contains ion conduction material, and wherein said charging member is adapted to be supplied with a second DC voltage of a polarity opposite from the predetermined polarity when such an area of said image bearing member as is going to be a non-image area of said image bearing member is at a charging position, and wherein when said second DC voltage is applied, said charging member is separated from said image bearing member.

2. An apparatus according to claim 1, wherein said charging member is supplied with said second DC voltage when a part of said area is at said charging position.

3. An apparatus according to claim 1, wherein the first DC voltage Vdc and the second DC voltage Vinv satisfy:

$$0.2|Vdc| \leq |Vinv| \leq 2|Vdc|.$$

4. An apparatus according to claim 1, wherein said charging member is in the form of a roller.

* * * * *

UNITED STATES PATENT AND TRADEMARK OFFICE
CERTIFICATE OF CORRECTION

PATENT NO. : 5,678,136
DATED : October 14, 1997
INVENTOR(S) : WATANABE ET AL.

It is certified that error appears in the above-identified patent and that said Letters Patent is hereby corrected as shown below:

Column 1

Line 12, "member" should read --member,--; and
    Line 18, "an or" should read --or an--.

Column 2

Line 12, "drum," should read --drum(a),--; and
    Line 29, "am" should read --an--.

Column 3

Line 10, "82." should read --8a.--;
    Line 30, "polyurethane;" should read --polyurethane,--;
    Line 42, "an" should read --increases with an--, and "a" should read --care of a--;
    Line 50, "to" should be deleted; and
    Line 55, "view" should read --views--.

Column 4

Line 1, "(FIG. 3(b)." should read --(FIG. 3b).--;
    Line 4, "(FIG. 3(c)." should read --(FIG. 3c).--;
    Line 13, "(3)" should read --¶3--, and "of" (second occurrence) should read --in--;
    Line 27, "be" should read --be a--;
    Line 28, "areas" should read --area--; and
    Line 36, "between" should be deleted.

UNITED STATES PATENT AND TRADEMARK OFFICE
CERTIFICATE OF CORRECTION

PATENT NO. : 5,678,136
DATED : October 14, 1997
INVENTOR(S) : WATANABE ET AL.

It is certified that error appears in the above-identified patent and that said Letters Patent is hereby corrected as shown below:

<u>Column 5</u>

Line 19, "Preferably" should read --preferably--;
    Line 23, "the" (second occurrence) should read --to--;
    Line 26, "8" should read --8 is--; and
    Line 37, "During" should read --During an--.

<u>Column 6</u>

Line 14, "structure" should read --structures--.

Signed and Sealed this

Thirty-first Day of March, 1998

Attest:

BRUCE LEHMAN

*Attesting Officer*       *Commissioner of Patents and Trademarks*